(12) United States Patent
Ljung et al.

(10) Patent No.: US 11,368,512 B2
(45) Date of Patent: Jun. 21, 2022

(54) METHOD AND SYSTEM FOR UTILIZING NETWORK CONDITIONS FEEDBACK FOR IMPROVING QUALITY OF A COLLABORATIVE MEDIA PRODUCTION

(71) Applicant: Sony Corporation, Tokyo (JP)

(72) Inventors: Rickard Ljung, Lund (SE); Daniel Lonnblad, Lund (SE); Peter Isberg, Lund (SE)

(73) Assignee: Sony Group Corporation, Tokyo (JP)

( * ) Notice: Subject to any disclaimer, the term of this patent is extended or adjusted under 35 U.S.C. 154(b) by 8 days.

(21) Appl. No.: 17/269,794

(22) PCT Filed: Jul. 26, 2019

(86) PCT No.: PCT/US2019/043792
§ 371 (c)(1),
(2) Date: Feb. 19, 2021

(87) PCT Pub. No.: WO2020/040940
PCT Pub. Date: Feb. 27, 2020

(65) Prior Publication Data
US 2021/0243243 A1    Aug. 5, 2021

(30) Foreign Application Priority Data
Aug. 20, 2018 (SE) .................................. 1830245-5

(51) Int. Cl.
*H04L 65/60* (2022.01)
*H04L 65/75* (2022.01)
*H04L 65/80* (2022.01)

(52) U.S. Cl.
CPC .......... *H04L 65/764* (2022.05); *H04L 65/765* (2022.05); *H04L 65/80* (2013.01)

(58) Field of Classification Search
CPC ....... H04L 47/805; H04L 65/80; H04L 47/24; H04L 65/4092; H04L 65/4069; H04N 21/2662; H04N 21/64723; H04N 21/26216
See application file for complete search history.

(56) References Cited

U.S. PATENT DOCUMENTS

| 2007/0258418 A1 | 11/2007 | Wurtenberger et al. |
| 2009/0231415 A1 | 9/2009 | Moore et al. |
| (Continued) |

FOREIGN PATENT DOCUMENTS

| EP | 3285518 A1 | 2/2018 |
| WO | 2012044988 A1 | 4/2012 |
| (Continued) |

OTHER PUBLICATIONS

Sony Mobile Communications, "FLUS: Network Assistance", 3rd Generation Partnership Project (3GPP), Oct. 9-13, Belgrade, Serbia, S4-170905, 3 pages.

(Continued)

*Primary Examiner* — Hitesh Patel
(74) *Attorney, Agent, or Firm* — Tucker Ellis LLP

(57) ABSTRACT

The media production element combines media content from a plurality of streaming electronic devices when they are registered to be within the same streaming event. The media production element can produce a combined live video stream or a combined media production using selections and combinations of the streamed content provided by the multiple electronic devices. A network assistance device can provide feedback to the media production element regarding network conditions for the electronic devices that are registered to an event. Such feedback can prevent bad network connections from affecting the final media production by helping the media production element to decide which data stream to use in the production and when to (Continued)

switch from an electronic device that can be on its way to losing optimum radio conditions.

14 Claims, 12 Drawing Sheets

(56) References Cited

U.S. PATENT DOCUMENTS

| | | |
|---|---|---|
| 2013/0042276 A1 | 2/2013 | Payette et al. |
| 2013/0290557 A1 | 10/2013 | Baratz |
| 2013/0336627 A1 | 12/2013 | Calvert |
| 2014/0006515 A1 | 1/2014 | Yeskel et al. |
| 2014/0189760 A1 | 7/2014 | Payette et al. |
| 2015/0281305 A1 | 10/2015 | Sievert et al. |
| 2016/0100329 A1 | 4/2016 | Miller |
| 2016/0294763 A1 | 10/2016 | Miller |
| 2017/0093942 A1 | 3/2017 | Danielsson et al. |
| 2017/0272491 A1 | 9/2017 | Ortiz et al. |
| 2018/0139254 A1 | 5/2018 | Oyman |
| 2018/0276961 A1 | 9/2018 | Roth et al. |
| 2018/0367579 A1 | 12/2018 | Kolan et al. |
| 2019/0104326 A1 | 4/2019 | Stockhammer et al. |
| 2019/0173935 A1 | 6/2019 | Lohmar et al. |
| 2019/0394498 A1 | 12/2019 | Lo et al. |
| 2020/0260134 A1* | 8/2020 | D'Acunto ............. H04L 65/605 |
| 2020/0351449 A1 | 11/2020 | Oh et al. |
| 2020/0359395 A1 | 11/2020 | Lohmar et al. |
| 2021/0176530 A1* | 6/2021 | Lobanov .......... H04N 21/44222 |

FOREIGN PATENT DOCUMENTS

| | | |
|---|---|---|
| WO | 2013033565 A1 | 3/2013 |
| WO | 2016003344 A1 | 1/2016 |
| WO | 2016160411 A1 | 10/2016 |
| WO | 2017063189 A1 | 4/2017 |
| WO | 2018027237 A1 | 2/2018 |
| WO | 2018086695 A1 | 5/2018 |

OTHER PUBLICATIONS

International Search Report and Written Opinion from corresponding International Application No. PCT/US2019/043792 dated Oct. 8, 2019, 16 pages.

Office Action from corresponding Swedish Application No. 1830245-5 dated Apr. 16, 2019.

3rd Generation Partnership Project, Technical Specification Group Services and System Aspects, "Guidelines on the Framework for Live Uplink Streaming (FLUS)", Jun. 22, 2018, France, TR 26.939, Release 15, pp. 1-29.

Sony Mobile Communications, Ericsson LM, "E-FLUS: Network Assistance", 3rd Generation Partnership Project (3GPP), Jul. 9-13, 2018, Rome, Italy, S4-180713, pp. 1-2.

"Study on Server and Network-assisted Dynamic Adaptive Streaming over HTTP (DASH) (SAND) for 3GPP Multimedia Services", 3rd Generation Partnership Project (3GPP), Mar. 2017, 3GPP TR 26.957, V14.1.0, Release 14, 52 pages.

K. Balachandran et al., "Proactive Content Rate Selection for Enhanced Streaming Media Quality," 2008 IEEE Sarnoff Symposium, Princeton, NJ, 2008, pp. 1-6.

Ericsson LM, "New Workflow: Drone Mounted Cameras", 3rd Generation Partnership Project (3GPP), Jul. 9-13, 2018, Rome, Italy, vol. SA WG4, pp. 1-4.

Qualcomm Incorporated, "Upload Strategies in E-FLUS", 3rd Generation Partnership Project (3GPP), Jul. 9-13, 2018, Rome, Italy, S4-180700, pp. 1-5.

* cited by examiner

METHOD AND SYSTEM FOR UTILIZING NETWORK CONDITIONS FEEDBACK FOR IMPROVING QUALITY OF A COLLABORATIVE MEDIA PRODUCTION

TECHNICAL FIELD OF THE INVENTION

The technology of the present disclosure relates generally to wireless communications among electronic devices in a network environment and, more particularly, to methods of providing feedback to a media production element regarding network conditions for the electronic devices that are registered to an event providing and employing network assistance as part of an uplink streaming based collaborative media production, and related devices.

BACKGROUND

In a network, such as a cellular or mobile network, a client device may stream media content to a media production entity. For instance, a professional video camera or a portable electronic device used to cover a live sporting, music, or news event may provide an audiovisual stream in an uplink transmission. Other devices also may live stream audiovisual content to a network, such as a wireless handheld device in the form of a smart phone, a tablet computer or similar device.

In these examples, the client device, as the source of the media stream, is conventionally configured to transmit data with the highest bit rate that the client can generate. Various problems arise with such an uplink media stream in situations where multiple client devices are streaming media content intended for a collaborative media production. One problem is that the network node adapting the streaming will assume that the streaming media content is only coming from the individual client, so each individual streaming link should be optimized individually.

There exists a need to further improve streaming in situations where multiple clients are streaming data in a collaborative manner.

SUMMARY

Disclosed are features that may enhance the quality of experience (QoE) of uplink media streaming services in situations where multiple client devices are streaming content intended for a collaborative production. The disclosed features may improve the QoE specifically when operating on a network where spectrum resources are shared among multiple users, for example in a wireless mobile or cellular network according to any appropriate set of standards such as those promulgated by 3GPP. The disclosed features may also improve resource utilization for network operators and the quality of the collaborative production.

According to aspects of the disclosure, a method of providing event-coordinated uplink network assistance by a network assistance service to a plurality of electronic devices includes registering a plurality of data streams from the plurality of electronic devices to an event; collecting connection status information about one or more data streams of the plurality of data streams during the event; determining network condition information from the connection status information; and transmitting network condition information to a media production service.

According to one embodiment of the method, the network assistance service is hosted by a DASH-aware network element (DANE).

According to one embodiment of the method, the network assistance service is hosted by a framework for live uplink streaming (FLUS).

According to one embodiment of the method, the connection status information includes one or more link parameters including at least one of a received signal strength, a radio condition variation parameter, a data load for a present cell, or an indication of a switching between cells.

According to one embodiment of the method, the connection status information includes one or more application parameters including at least one of an aggregated media rate for the event, an aggregated data rate for the event, a media rate for an individual electronic device of the plurality of electronic devices, or a data rate for the individual electronic device of the plurality of electronic devices.

According to one embodiment of the method, determining the network conditions information includes comparing the connection status information to a network conditions requirement parameter.

According to one embodiment of the method, the method further includes determining future expected connection status information, and determining the network conditions information includes comparing the future expected connection status information to a network conditions requirement parameter.

According to one embodiment of the method, the network condition information is transmitted to the media production service at a predetermined periodicity.

According to one embodiment of the method, the network condition information is transmitted to the media production service based on a triggering event.

According to one embodiment of the method, the network condition information includes a packet loss rate.

According to one embodiment of the method, the network condition information includes raw radio condition parameters.

According to one embodiment of the method, determining the network condition information comprises calculating a weighted quality of service value from the connection status information.

According to one embodiment of the method, determining the network condition information comprises using a mean opinion score prediction model to determine a predicted quality of experience value.

According to one embodiment, the method is performed by a network element.

According to aspects of the disclosure, a method of producing a combined media production includes receiving a plurality of data streams from a plurality of electronic devices registered to an event; receiving network condition information for the plurality of data streams from a network assistance service; and selecting a first data stream from the plurality of data streams, based at least partially on the network condition information, to include in the combined media production during a first time segment.

According to one embodiment, the plurality of electronic devices includes a first electronic device that communicates through a first operator network and is associated with a first network assistance service, and a second electronic device that communicates through a second operator network and is associated with a second network assistance service.

According to one embodiment, the network condition information is received from the first network assistance service and the second network assistance service.

According to one embodiment, the method further includes determining, based on the network condition information, that the first data stream has, or will have, a quality of service value less than a threshold quality of service value; and selecting, based on determining that the first data stream has, or will have, a quality of service value less than the threshold quality of service value, a second data stream from the plurality of data streams to include in the combined media production during a second time segment following the first time segment.

According to one embodiment, the method further includes determining, based on the network condition information, that communications from a first electronic device corresponding with the first data stream are, or will soon be throttled; and selecting, based on determining that communications from the first electronic device corresponding with the first data stream are, or will soon be throttled, a second data stream from the plurality of data streams to include in the combined media production during a second time segment following the first time segment.

According to one embodiment, the method is performed by a media production element.

DETAILED DESCRIPTION OF EMBODIMENTS

A. Introduction

Figure 1:
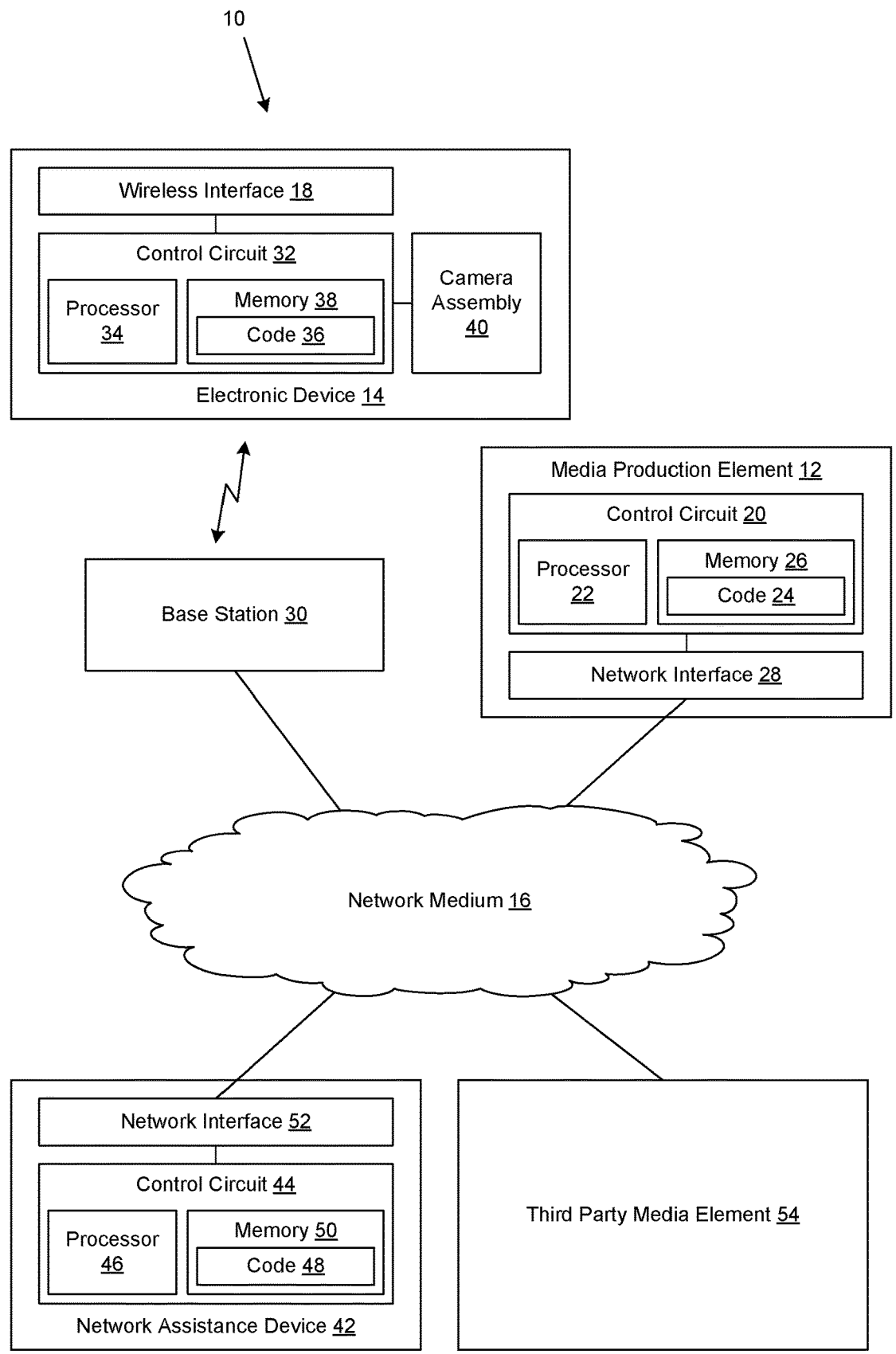
FIG. 1 is a schematic block diagram of a representative network system that conducts network assistance for uplink media transmission for a collaborative media production.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of systems and methods for conducting wireless radio communications that include event-coordinated network assistance for uplink streaming. The event-coordinated network assistance for uplink streaming may be carried out in an automated manner by the respective services on the network. The event-coordinated network assistance for uplink streaming may improve uplink streaming performance.

B. System Architecture

FIG. 1 is a schematic diagram of an exemplary network system 10 for implementing the disclosed techniques. It will be appreciated that the illustrated system is representative and other systems may be used to implement the disclosed techniques. The exemplary network system 10 includes a media production element 12 for data streamed by an uplink from an electronic device 14. The media production element 12 typically will be a server, a component of a server, or other device located in and/or managed by a core network of a wireless mobile or cellular network operator. Clients for the received media stream also may be reachable via the operator's core network, or over a wider network such as the Internet.

The electronic device 14 transmits data and control signaling via a base station 30 or other access point that operates in accordance with a cellular or mobile device network protocol such as, but not limited to a protocol promulgated by the 3rd Generation Project Partnership (3GPP). An exemplary base station 30 may be a long term evolution (LTE) base station, often referred to as an enhanced Node B (eNodeB or eNB), or a next generation Node B (gNB). The base station 30 services one or more electronic devices, including the electronic device 14. The base station 12 may support communications between the electronic devices and a network medium 16 through which the electronic devices may communicate with other electronic devices, servers, which can be connected within the operator's core network, or via the Internet, etc. One device that the electronic device 14 may communicate with via the network medium 16 is the media production element 12. It will be understood that other locations in the network architecture for the media production element 12 are possible. As an example of another location of the media production element 12, the media production element 12 may be a server on the Internet for streaming services that are not managed by a wireless network operator.

The source of the streamed data may be any client or terminal of the base station 12. An exemplary electronic device 14 that can be the source of the streamed data may be a user equipment (UE), as referred to in accordance with the general terminology adopted in 3GPP specifications. The electronic device 14 may be any kind of electronic device that provides a media stream via a wireless interface 18 (e.g., a 3GPP wireless modem). Exemplary electronic devices 14 include, but are not limited to, a smart phone, a tablet computer, a desktop or laptop computer, a video camera, etc. In the case of a video camera, the video camera may be included in a drone, may be operated by a person, may be an autonomous surveillance camera, etc. In one embodiment, the video camera may be a professional style camera used by a news or live event reporting organization. The electronic device 14 also may be the source of a contribution feed that is transmitted via an uplink, such as an outside-broadcast van or mobile studio that transmits a contribution feed as an aggregate of several cameras or other device feeds, or as a pre-produced edit and audio mix of an event being covered. In these contribution feed situations, a plurality of electronic devices may also be providing contribution feeds pertaining to the same event. The video camera may include the wireless interface 18 or may be operatively connected through a local interface to the wireless interface 18 using a cable or electrical connector, for example. In the case of a video camera operated by a news or live event reporting organization, the organization may make an arrangement with the operator of the mobile network to provide enhanced bandwidth capacity to support audiovisual content streaming. For example, the video camera may have access to multiple carriers in the network to deliver content using carrier aggregation. The wireless network could also provide sufficient bandwidth capacity for the media stream in a single carrier or channel.

The media production element 12 may include operational components for carrying out wireless communications and other functions of the media production element 12. For instance, the media production element 12 may include a control circuit 20 that is responsible for overall operation of the media production element 12, including controlling the media production element 12 to carry out the operations applicable to the media production element 12 and described in greater detail below. The control circuit 20 includes a processor 22 that executes code 24, such as an operating system and/or other applications. The functions described in this disclosure document and applicable to the media production element 12 may be embodied as part of the code 24 or as part of other dedicated logical operations of the media production element 12. The logical functions and/or hardware of the media production element 12 may be implemented in other manners depending on the nature and configuration of the media production element 12. Therefore, the illustrated and described approaches are just examples and other approaches may be used including, but not limited to, the control circuit 20 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.). It can be noted that although the examples of implementation given are provided for the uplink streaming scenario other embodiments could be based on downlink data. The event priority could be applied to a coordinated downlink streaming from a data source towards multiple devices, or the event priority could be applied to an event which includes both uplink and downlink oriented data streaming.

The code 24 and any stored data (e.g., data associated with the operation of the media production element 12) may be stored on a memory 26. The code 24 may be embodied in the form of executable logic routines (e.g., a software program) that are stored as a computer program product on a non-transitory computer readable medium (e.g., the memory 26) of the media production element 12 and are executed by the processor 22. The functions described as being carried out by the media production element 12 may be thought of as methods that are carried out by the media production element 12.

The memory 26 may be, for example, one or more of a buffer, a flash memory, a hard drive, a removable media, a volatile memory, a non-volatile memory, a random access memory (RAM), or other suitable device. In a typical arrangement, the memory 26 includes a non-volatile memory for long term data storage and a volatile memory that functions as system memory for the control circuit 20. The memory 26 is considered a non-transitory computer readable medium.

The media production element 12 includes communications circuitry that enables the media production element 12 to establish various communication connections. For instance, the media production element 12 may have a network communication interface 28 to communicate with the network medium 16.

The electronic device 14 may include operational components for carrying out various functions of the electronic device 14 including wireless communications with the base station 30 and any other devices with which the electronic device 14 may communicate. One function of the electronic device 14 is network assisted uplink streaming and/or event-coordinated network assisted uplink streaming as will be described in greater detail. Among other components, the electronic device 14 may include a control circuit 32 that is responsible for overall operation of the electronic device 14, including controlling the electronic device 14 to carry out the operations described in greater detail below. The control circuit 32 includes a processor 34 that executes code 36, such as an operating system and/or other applications. The functions described in this disclosure document may be embodied as part of the code 36 or as part of other dedicated logical operations of the electronic device 14. The logical functions and/or hardware of the electronic device 14 may be implemented in other manners depending on the nature and configuration of the electronic device 14. Therefore, the illustrated and described approaches are just examples and other approaches may be used including, but not limited to, the control circuit 32 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 36 and any stored data (e.g., data associated with the operation of the electronic device 14) may be stored on a memory 38. The code 36 may be embodied in the form of executable logic routines (e.g., a software program) that are stored as a computer program product on a non-transitory computer readable medium (e.g., the memory 38) of the electronic device 14 and are executed by the processor 34. The functions described as being carried out by the electronic device 14 may be thought of as methods that are carried out by the electronic device 14.

The memory 38 may be, for example, one or more of a buffer, a flash memory, a hard drive, a removable media, a volatile memory, a non-volatile memory, a random access memory (RAM), or other suitable device. In a typical arrangement, the memory 38 includes a non-volatile memory for long term data storage and a volatile memory that functions as system memory for the control circuit 32. The memory 38 is considered a non-transitory computer readable medium.

The electronic device 14 includes communications circuitry that enables the electronic device 14 to establish various communication connections. For instance, the electronic device 14 includes the wireless interface 18 over which wireless communications are conducted with the base station 30. Other communications may be established with the electronic device 14, such as Wi-Fi communications, wired connections, etc. The wireless interface 18 may include a radio circuit having one or more radio frequency transceivers (also referred to as a modem), at least one antenna assembly, and any appropriate tuners, impedance matching circuits, and any other components needed for the various supported frequency bands and radio access technologies.

Other components of the electronic device 14 may include, but are not limited to, user inputs (e.g., buttons, keypads, touch surfaces, etc.), a display, a microphone, a speaker, a sensor, a jack or electrical connector, a rechargeable battery and power supply unit, a SIM card, a motion sensor (e.g., accelerometer or gyro), a GPS receiver, and any other appropriate components. In particular, the electronic device 14 may include a camera assembly 40 with all appropriate optical and electronic imaging components, as well as components such as a video processor, video and audio encoders, etc.

In some implementations the logic (e.g., as implemented by the control circuit 20) that controls the wireless communication interface 18 is a so-called lower layer protocol architecture, and may include a physical layer, a medium access layer, a radio resource control layer, etc. This may be referred to as a modem entity of the electronic device 14. Further, in some implementations, the logic controlling the video media client and corresponding video content encoding, and any related functions, is a so-called higher layer architecture, and may include an IP layer, an application layer, etc. This logic may be referred to as an application entity, and may include an uplink video streaming client. With this separation in layers, in some implementations, the wireless modem entity communication with the cellular base station 30 is separated logically from the application entity data communication carried out with the media production element 12.

The network system 10 may include a network assistance device 42 that can provide network assistance services to any network element, including the electronic device 14 and/or the media production element 12 during uplink streaming. In an exemplary embodiment, the network assistance device 42 can be a DASH-aware network element (DANE). While DASH refers to dynamic adaptive streaming over hypertext transfer protocol (HTTP), the DANE may provide network assistance to uplink streaming that is carried out according to additional and/or other protocols, such as HTTP live streaming (HLS), real time transmission protocol (RTP), real time messaging protocol (RTMP), etc. In another exemplary embodiment, the network assistance device 42 can be implemented as part of a 3GPP framework for live uplink streaming (FLUS).

The network assistance device 42 may include operational components for carrying out various functions of the network assistance device 42 including providing uplink network assistance services to the electronic device 14 and/or media production element 12. Among other components, the network assistance device 42 may include a control circuit 44 that is responsible for overall operation of the network assistance device 42, including controlling the network assistance device 42 to carry out the operations described in greater detail below. The control circuit 44 includes a processor 46 that executes code 48, such as an operating system and/or other applications. The functions described in this disclosure document may be embodied as part of the code 48 or as part of other dedicated logical operations of the network assistance device 42. The logical functions and/or hardware of the network assistance device 42 may be implemented in other manners depending on the nature and configuration of the network assistance device 42. Therefore, the illustrated and described approaches are just examples and other approaches may be used including, but not limited to, the control circuit 44 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 48 and any stored data (e.g., data associated with the operation of the network assistance device 42) may be stored on a memory 50. The code 48 may be embodied in the form of executable logic routines (e.g., a software program) that are stored as a computer program product on a non-transitory computer readable medium (e.g., the memory 50) of the network assistance device 42 and are executed by the processor 46. The functions described as being carried out by the network assistance device 42 may be thought of as methods that are carried out by the network assistance device 42.

The memory 50 may be, for example, one or more of a buffer, a flash memory, a hard drive, a removable media, a volatile memory, a non-volatile memory, a random access memory (RAM), or other suitable device. In a typical arrangement, the memory 50 includes a non-volatile memory for long term data storage and a volatile memory that functions as system memory for the control circuit 44. The memory 50 is considered a non-transitory computer readable medium.

The network assistance device 42 includes communications circuitry that enables the network assistance device 42 to establish various communication connections. For instance, the network assistance device 42 includes a network interface 52 over which communications are conducted with the media production element 12, the electronic device 14 and any other devices via the network medium 16.

In the illustrated embodiment, the network assistance device 42 is implemented as a server that is out-of-band of the media delivery path of the content transmitted over the uplink stream from electronic device 14 to media production element 12. With an out-of-band architecture it is possible that the communication between the electronic device 14 and the network assistance device 42 is independent of communication between the electronic device 14 and the media production element 12. Therefore, communications between the electronic device 14 and the network assistance device 42 may occur in a separate communication path and/or data link than the communication path and/or data link used for the uplink steam. As such, the network assistance device 42 may be provided at various locations in the network system 10. For example, the network assistance device 42 may communicate with the electronic device 14 through the base station 30 as illustrated, through a different base station, or directly with the electronic device 14. In another embodiment, the functionality of the network assistance device 42 may be made part of the media production element 12.

The network system 10 also may include a third party media element 54. Data streamed from the electronic device 14 to the media production element 12 (via the base station 30 and its uplink data path) may be delivered to the third party media element 54. In one embodiment, the media production element 12 temporarily buffers the streamed data received from the electronic device 14 and delivers the data through the network medium 16 using an appropriate protocol, the details of which need not be discussed in detail for the purposes of this disclosure. In the case where the electronic device 14 is a video camera, the third party media element 54 may be part of a television studio that processes, stores and/or redistributes the audiovisual content received from the electronic device 14 to media players (e.g., TVs, smart phones, handheld devices, etc.). The content may be consumed by end users in a "tape-delayed" or "live" manner on the media players. In other situations, the third party media element 54 may be an end user device, or one of many end user devices that receive the media stream via a broadcast or multicast retransmission from the media production element 12 or other device (e.g., a retransmission server connected to the media production element 12).

C. Event-Coordinated Network Assistance for Uplink Streaming

Signaling

Figure 2:
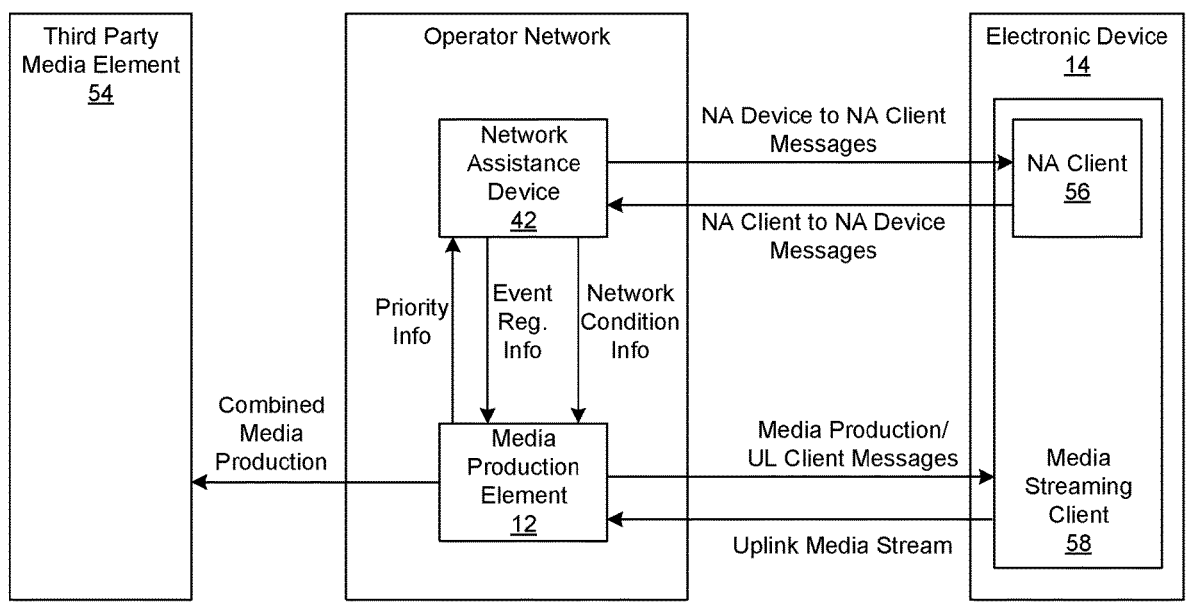
FIG. 2 is a representative high-level architectural diagram of network assistance for uplink media transmission for a collaborative media production.

FIG. 2 is a high-level architectural diagram of an uplink network assistance system that can be implemented for event-coordinated uplink network assistance that shows some of the system's signal flows and may be referenced in connection with the following descriptions as a representative approach to event-coordinated uplink network assistance.

In one embodiment, to assist in providing an improved quality of experience for the uplink video streaming, a signaling path may be established for network assistance (NA). Therefore, to implement NA functions, a signaling approach between the electronic device 14 and the network assistance device 42 may be established. In one embodiment this NA signaling approach is established between the electronic device 14 NA client 56 and the network assistance device 42. In a first direction, the network assistance device 42 can send event-coordinated uplink network assistance data to the NA client 56 of the electronic device 14 as described below. In a second direction, the NA client 56 of the electronic device 14 can send messages to the network assistance device 42. Such messages can include an event registration request, a request for event-coordinated uplink network assistance data, or device-related information. For example, device-related information can include information about available media quality levels such as frame rates, video and audio resolutions, etc. One or more signaling paths may also exist between the network assistance device 42 and the media production element 12. Event registration information and network condition information can be transmitted from the network assistance device 42 to the media production element 12, while priority information can be transmitted from the media production element 12 to the network assistance device 42. These signaling paths are described in greater detail below.

In one embodiment, the media production element 12 and an uplink client 58 of the electronic device share data paths. In a first direction, the media production element 12 can send messages to the uplink client 58 of the electronic device 14. For example, the media production element 12 messages can include requests for segments of the media stream, pause or resume stream commands, among others. In a second direction, the uplink client 58 of the electronic device 14 can transmit the uplink media stream to the media production element 12. In some embodiments, the media production element 12 can process the media stream from the electronic device 14 along with media streams from other electronic devices to create a combined media production. This combined media production can be transmitted to a third party media element 54. Third party media element 54 can further edit, view, display, or publish the combined media production. It should be appreciated that the described communication paths and functions of the network assistance device 42 and the media production element 12 can exist interchangeably between the two elements, or the communication paths and functions can exist in a single element.

General Operation

Certain events may involve multiple electronic devices simultaneously transmitting data in an area where there is a significant amount of electronic devices. In these situations, even if the wireless network may consist of multiple base stations, there is a high likelihood that the uplink data capacity is a limiting factor for the achievable uplink data rate on each of the electronic device to base station links. Also, due to the nature of wireless links causing channel fading, the achievable data rate in the uplink direction will vary over time as well even without considering the total uplink cell load. Using prior art systems, each connected electronic device would try to optimize its own transmission to create as high individual quality as possible without regard to any other electronic device, requiring as much uplink data capacity as available for each client.

Media production element 12 operates a media production service and can be configured to combine multiple live media streams of an event, when the multiple live media streams are being streamed by multiple electronic devices. The media production element 12 combines media content from a plurality of the streaming electronic devices when they are registered to be within the same streaming event. The media production element 12 can produce a combined live video stream or a combined media production using selections and combinations of the streamed content provided by the multiple electronic devices. In these embodiments, the network assistance device 42 can determine event-coordinated uplink network assistance data with the goal of prioritizing resource allocation to clients/electronic devices 14 that currently are used for the combined media production, and assign less resources to those that are not currently used. Rather than optimizing individual links, the event-coordinated uplink network assistance data is determined by taking the aggregated capacity and the production needs of the media production element 12 into account.

Figure 3:
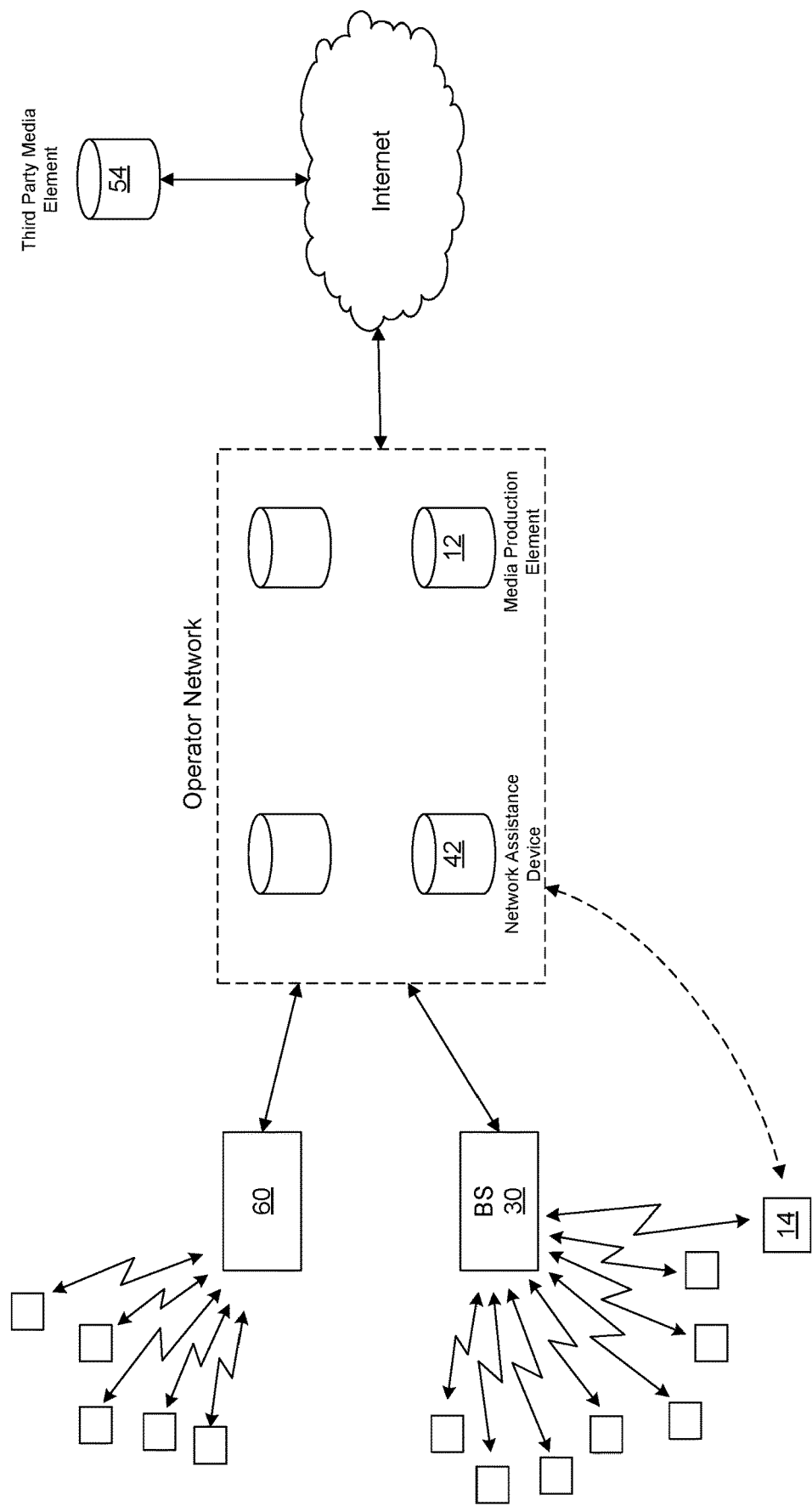
FIG. 3 is a schematic view of a representative embodiment of a network system that conducts network assistance for uplink media transmission for a collaborative media production.
Figure 4:
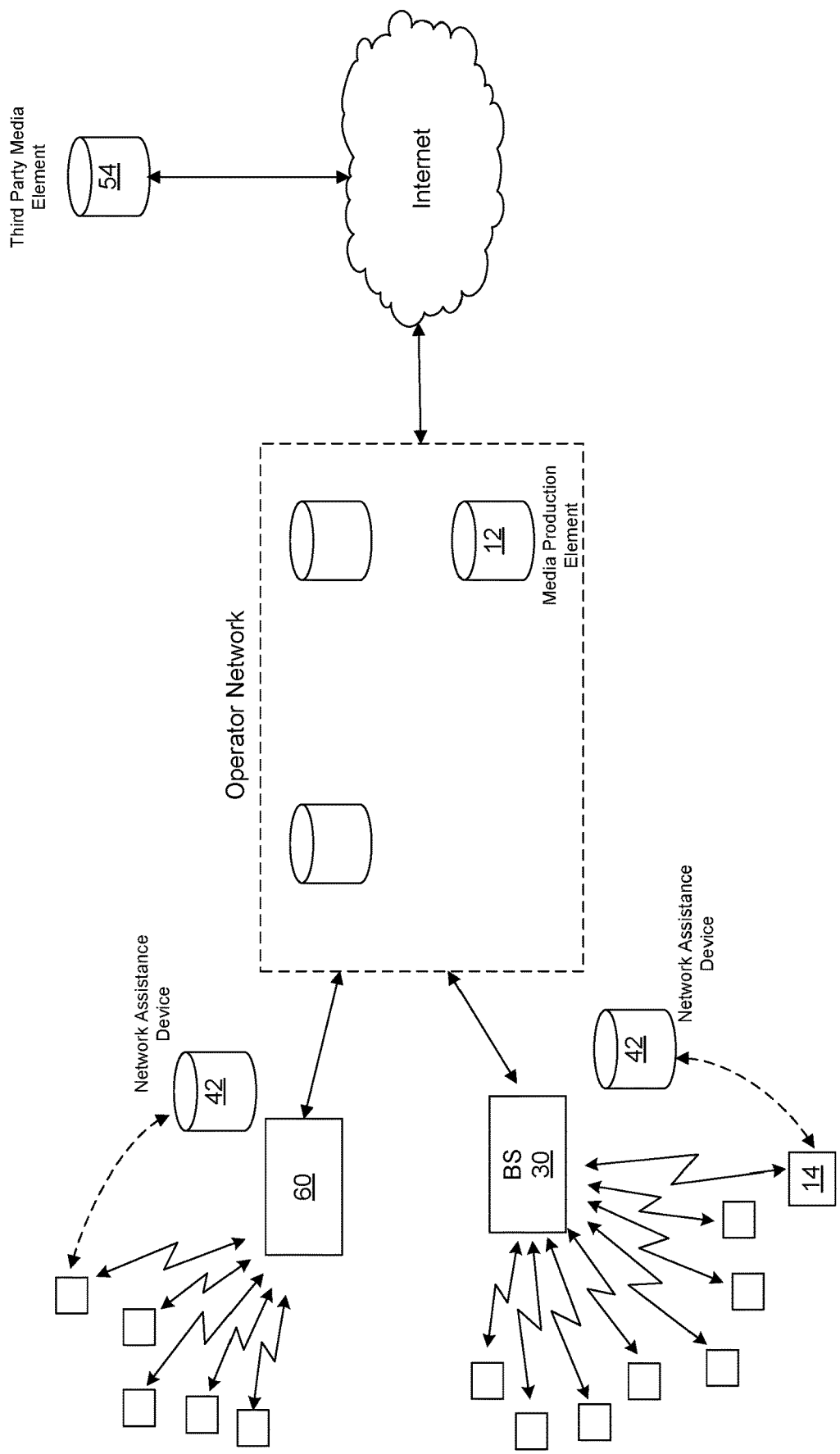
FIG. 4 is a schematic view of another representative embodiment of a network system that conducts network assistance for uplink media transmission for a collaborative media production.
Figure 5:
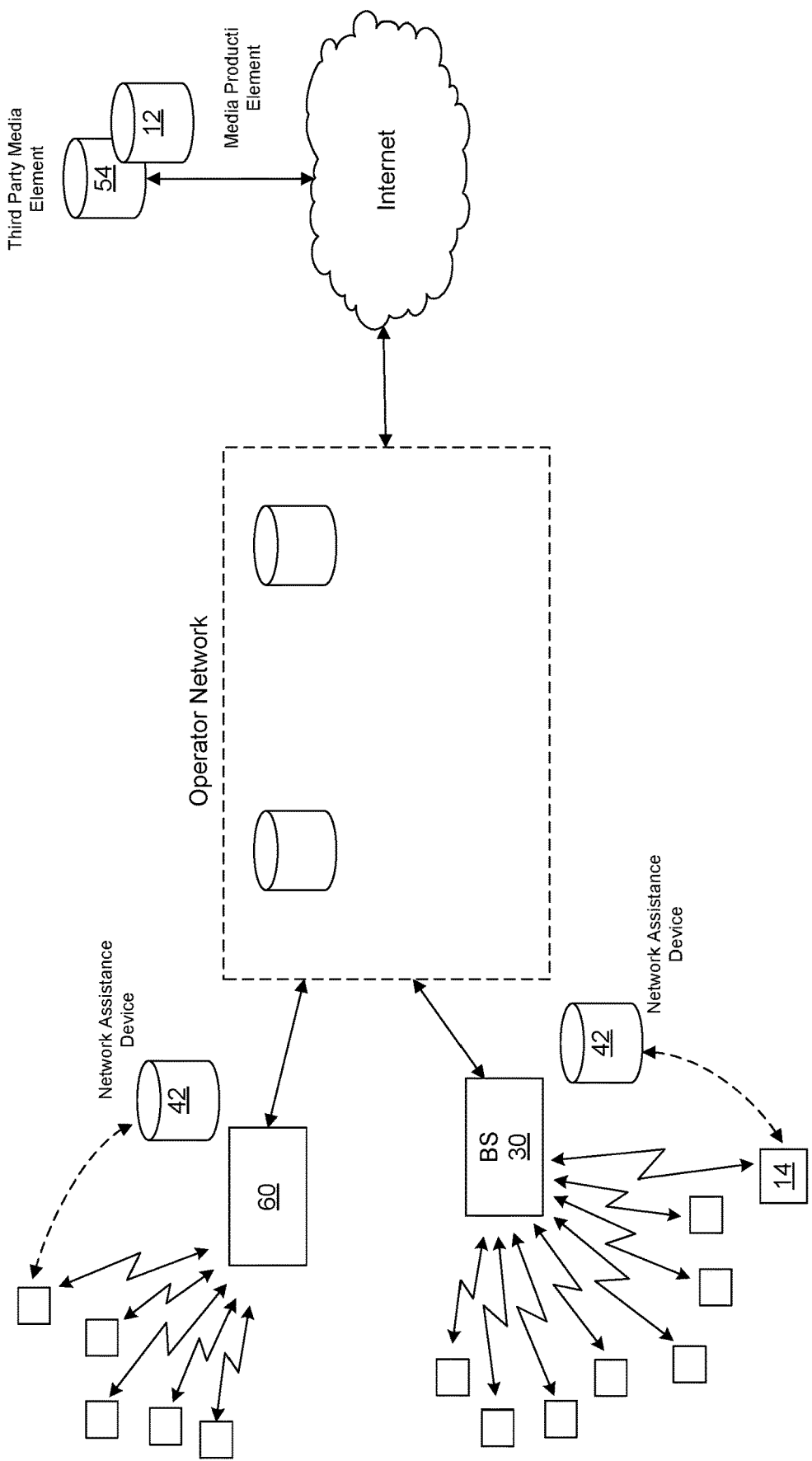
FIG. 5 is a schematic view of another representative embodiment of a network system that conducts network assistance for uplink media transmission for a collaborative media production.

Example network architectures of various embodiments are provided in FIGS. 3-5. In general, several different architectures can be used to implement the different functions of network assistance and media production, and it should be appreciated that the functions can be implemented as separate nodes or within any other node.

Turning now to FIG. 3, the network assistance device 42 and the media production element 12 are implemented on nodes located on the operator network, but separate from the base station 30 (e.g. eNB, or gNB). Both the network assistance device 42 and the media production element 12 can be in communication with the base station 30 and/or directly with the electronic device 14. Network assistance device 42 and media production element 12 can communicate and provide functionality to the base station 30 and also to a second base station 60. Base station 30 and second base station 60 may or may not provide service to electronic devices corresponding to the same event.

Turning now to FIG. 4, the network assistance device 42 may be implemented in or connected to the base station 30 (e.g. eNB, or gNB), and therefore have information about the scheduling load or other indications of the available uplink transmission capacity. In certain embodiments, the network assistance device 42 can be implemented in or connect to a second base station 60, which may or may not provide service to electronic devices corresponding to the same event.

Turning now to FIG. 5, the network assistance device 42 may be implemented in or connected to the base station 30 as described above with respect to FIG. 4. Further, the media production element 12 may be implemented in or connected to a third party media element 54. In these embodiments, the media production element 12 is not a part of the operator network and can be integrated with the third party media element 54.

Regardless of the network architecture arrangement, the event-coordinated uplink network assistance systems and methods can function as described below. A media streaming client 58, residing in a transmitting device (e.g. electronic device 14), can establish an uplink media streaming session to belong to a certain event. Further, one or more additional streaming clients at the event can also establish an uplink media streaming session to belong to the event. Examples of such events are concerts, sports events and news events. This event registration can be accomplished with a network function, for example, with a network assistance device 42 for video streaming. In one example, the network assistance device 42 can be a DASH aware network element (DANE), where the video streaming session could be initiated. In another example, the network assistance device 42 can be a part of a 3GPP framework for live uplink streaming (FLUS). In certain embodiments, the event registrations, creating links between the media streaming electronic devices to the network assistance device 42, can be performed directly between media streaming electronic devices and the network assistance device 42. For example, this event registration process can be performed using DNS lookup to identify the IP address of the relevant network assistance device 42, or indirectly via another node such as the media production element 12.

In certain embodiments, the network assistance device 42 and the media production element 12 may be defined as different entities, but they could as well be the same network entity, meaning, for example, that a registration performed with respect to a network assistance device 42 directly and this network assistance device 42 may also include a media production element 12.

When the electronic device 14 is registered/initiated into an event, the electronic device 14 will be able to receive event-coordinated uplink network assistance data that is specific to the event, from the network assistance device 42. This event specific information can include information related to its own streaming session, and can also include information related to the total event in which multiple electronic devices can be connected. Such information could include but is not limited to information about the number of electronic devices registered to the event, the total allocated network resources for the event, or information related to the radio link performance on its established link compared to other client-to-network links. Such information can be provided regularly by the network assistance server in a request-response fashion, where the electronic device 14 receives event information from the network assistance device 42 based on requesting the information. The information may also be "pushed" to the electronic device 14 from the network assistance device 42, that is, be delivered without an explicit request from the electronic device 42. When the electronic device 14 receives such event specific information it may adapt its transmissions of content in order to optimize the overall combined media production and/or to optimize the wireless network load and/or to reduce the energy consumption in the electronic device 14.

In certain embodiments, the event-coordinated uplink network assistance data is shared once during the registration. In other embodiments, the event-coordinated uplink network assistance data can be shared multiple times. For example the network assistance device 42 can transmit assistance information with a certain periodicity, or the network assistance device 42 can respond with assistance information upon receiving information requests from an electronic device 14. The event-coordinated uplink network assistance data could provide the electronic device 14 with additional information for the streaming session that enables an improved streaming performance for the individual electronic device 14 and for the total group of electronic devices also registered to the event. For example, the electronic device 14 may use the event-coordinated uplink network assistance data to adapt its transmission during the streaming event. Such adaptation could be to increase or decrease the streaming video resolution and/or frame rate, selecting a media codec, selecting a media operating point, selecting a media quality, selecting a data rate, selecting a compression level, pausing the data streaming session, or resuming the data streaming session. The event-coordinated uplink network assistance data may depend on the number of connected electronic devices, e.g. within a given geographic area or connected to a certain base station, or registered to a certain event. As a benefit for the electronic device 14, this may reduce the device energy consumption during streaming. In certain embodiments, another incentive to register to the event production could be to gain access to the final combined media production, and/or receive a revenue share if the combined media production is published.

Further, while the electronic device 14 is registered and active in a streaming event, the event-coordinated uplink network assistance data received by the electronic device 14 can also include uplink transmission commands or recommendations from the network assistance device 42 coordinating the event. Such uplink transmission commands or recommendations can be received as part of a request-response procedure. Specifically, the transmission commands or recommendations are executed to coordinate multiple uplink streaming electronic devices to produce a combined media production. Such coordination could consist of providing the electronic device 14 with requests/recommendations on its streaming transmissions, in order to enable the network assistance device 42, media production element 12, and/or third party media element 54 to optimize the combined media production. In certain situations, not all uplink media streams registered to an event are individually as important, and therefore some of the uplink media streams can, for example, at certain times be reduced in its media rate or paused. However, for the media production in the third party media element 54 or the media production element 12, it is still important to see as many media streams as possible in order to quickly respond to changes in the media streams. The media production element 12 or third party media element 54 can transmit media optimization information to the network assistance device 42 to instruct the network assistance device 42 the priority level of each media stream. The network assistance device 42 can continuously coordinate the quality levels, pause, or resume for each stream to give the media production element 12 or the third party media element 54 the best possible input for the production, but still reduce the network load.

Certain embodiments also include electronic device 14 to network assistance device 42 information sharing. In these embodiments, the electronic device 14 can provide device-related information to the network assistance device 42. The device-related information can include information about the electronic device's 14 available media quality levels.

This can include available frame rates, video resolutions, audio resolutions, etc. This information can be provided to the network assistance device 42 so that the network assistance device 42 can select or recommend between available media quality levels. This communication can occur when the electronic device 14 registers its uplink data stream to the network assistance device 42 as part of an event.

In addition to providing requests/recommendations to the electronic device 14 regarding its streaming transmissions, the network assistance device 42 can request, from other network functions including radio access functions, suitable priority in scheduling and/or other network resource allocation. For example, if a network assistance device 42 detects that electronic devices registered to an event require additional resources, e.g. radio access capacity, in order to provide media streams of an acceptable quality as determined by the media production element 12, resources can be diverted from other traffic. In other embodiments a network assistance device 42 may provide information indicative of a priority for a given electronic device 14 to other network functions. In this manner, network assistance device 42 can affect prioritization of certain events' data streams over other events' data streams or over other unrelated traffic in the network. Also, network assistance device 42 may affect prioritization of data related to certain electronic devices compared to other electronic devices. In certain embodiments the network assistance device 42 or any other network function may provide information to an electronic device 14 participating in an event about intended or given network priority or a change of network priority. Such information provided to the electronic device 14 may indicate to the electronic device 14 whether the event participation affects the data priority for the device within the network. Such information may be indicative of a time period for such priority change, e.g. during how long time a change in priority is valid.

The combined media production can be constructed by selecting segments provided by the media streams from different electronic devices over time. In certain embodiments, the media production element 12 constructs the combined media production. In other embodiments, the third party media element 54 constructs the combined media production. The media production element 12 and/or third party media element 54 can assign priorities to individual streams based on whether the individual stream is currently being used as part of the combined media production, whether the stream may be used in the near future as part of the combined media production, or whether the individual stream is not currently needed. Such priorities can be communicated to the network assistance device 42 so that the network assistance device 42 can use these priorities in determining the event-coordinated uplink network assistance data to be sent to the corresponding electronic device 14. In an example, if the segments currently selected for the combined media production are being transmitted from one electronic device 14 at a given point of time, the network assistance device 42 can during that time instruct one or more other electronic devices to transmit uplink segments in medium to low quality and or frame rate since it may want to select any of these electronic devices for an upcoming media segment. Further, the network function may instruct one or more other electronic devices to pause the streaming or not to transmit uplink media segments for a given period of time, since the network assistance device 42 may currently not consider any of their uplink media segments to be important or suitable for use in the combined media production. The selection of quality/rate levels and/or transmission pauses can be decided based on both the media production element's 12 prioritization of media streams and estimations or measurements of the uplink capacity as a whole.

Figure 6:
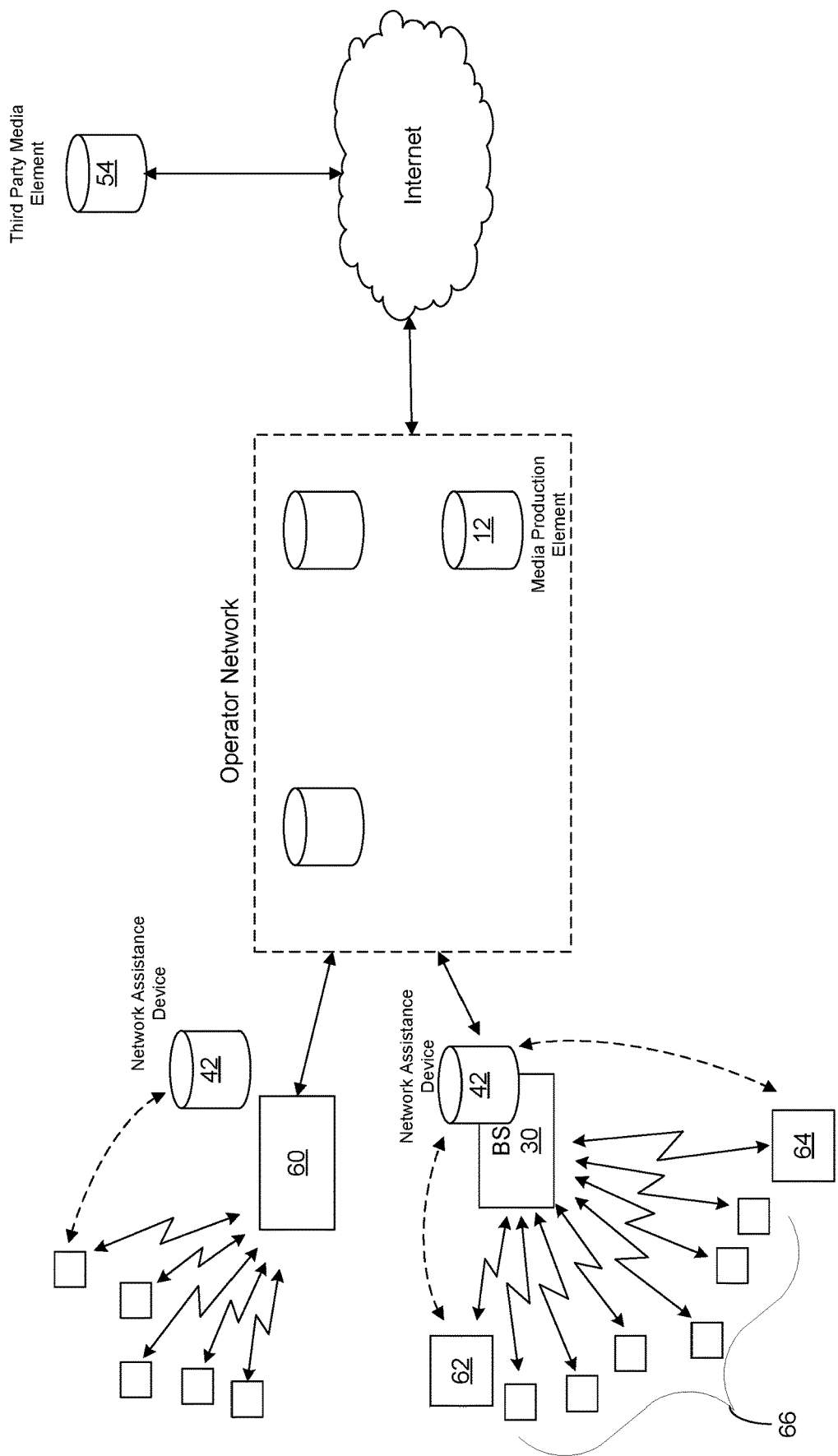
FIG. 6 is a schematic view of another representative embodiment of a network system that conducts network assistance for uplink media transmission for a collaborative media production.

Turning now to FIG. 6, further disclosed is a method in which a network assistance node can receive input signaling about event specific priority. Such signaling could follow the same signaling procedure as for the live uplink streaming in 3GPP in TS 26.238, where the signaling is typically performed as HTTP based communication. The event specific priority may be transmitted from a media production service. The network assistance service can take the event specific priority into account when determining event-coordinated uplink network assistance data, suggesting media rates, and controlling media streaming parameter suggestions to the devices participating in the event.

In one example, the first electronic device 62 and second electronic device 64 can send an event registration request to a network assistance service, which may operate as part of, for example, the network assistance device 42. As part of sending the event registration request, the first electronic device 62 and second electronic device 64 can send event registration information. This event registration information can include an identification of the desired event, and device information pertaining to the device sending the event registration information. The device information can include at least one of a device identification, a device location, a device type, a camera type, device capabilities, camera specifications, or an identity of a user of the first electronic device. After registering the first electronic device 62 and the second electronic device 64 to the event, the network assistance service can relay all or a portion of the device information about the first electronic device 62 and/or the second electronic device 64 to the media production service which may operate on, for example, the media production element 12 or the third party media element 54.

The media production service can determine and transmit priority information to the network assistance service as depicted in FIG. 2. The priority information can include an event priority, which is information used to establish a priority between event participating devices (such as first electronic device 62 and second electronic device 64), and data traffic from other devices 66 not registered to the event. The priority information can further include an individual priority, which is information to establish a priority between individual devices registered to an event. For example, an individual priority can establish a priority between a first device 62 registered to the event, and a second device 64 also registered to the event.

The media production service can determine the event priority information based on a predetermined agreement (e.g. a commercial agreement) for prioritizing the event and for primarily allocating certain network resources to the devices within the event. For example, the event priority information can specify that at least one or a few dynamically assigned streams from devices within the event have full desired quality throughput at any given time. In another example, the event priority information can specify that the event-related uplink streaming content is not included in a standard data limit that applies to the corresponding electronic device. In certain embodiments, the media production service determines event priority information that specifies certain network resources prioritized for the event. For example, the priority information can specify that a given set of frequency resources and/or time resources are primarily available to transmission for the event, and only are secondarily available to other traffic not belonging to the event.

In another example, the priority information can specify that the event should be provided with a minimum indicated capacity such as an aggregated minimum bandwidth, bits/second, or similar measurement of data communications capacity.

The media production service can determine the individual priority information based on the device information. For example, a higher priority may be assigned to the first electronic device 62 as compared to the second electronic device 64 based on superior video camera capabilities (e.g. 4K video resolution, aerial or drone capabilities) of the first electronic device 62 as compared to the second electronic device 64. In another example, a higher priority may be assigned to first electronic device 62 as compared to the second electronic device 64 based on an identity of the user of the electronic device. If the person using the first electronic device 62 captures better views or has better camera skills than the person using the second electronic device 64, the first electronic device 62 may be assigned a higher priority than the second electronic device 64. Devices can be assigned priorities statically or temporarily. When temporary priorities are assigned by the media production service or other event controlling unit, the priority information transmitted to the network assistance service can include timing information regarding the validity or expiration of the priority information. In this manner, the media production service can determine and set a time window in which a specific device is assigned a priority.

After receiving the priority information from the media production service, the network assistance service can determine event-coordinated uplink network assistance data based at least partially on the priority information. The network assistance service can provide recommendations to the electronic devices 62, 64, 66 according to the priority information provided by the media production service. For example, the recommendations can include any of a recommended media codec, a recommended media operating point, a recommended media quality, a recommended data rate, a recommended frame rate, a recommended resolution, a recommended compression level, a pause data stream command, or a resume data stream command. In one example, the priority information indicates that electronic devices (e.g. first and second electronic devices 62, 64) that are registered to the event have full desired quality throughput available at any given time. In this situation, the network assistance service will provide recommendations to the first and second electronic devices 62, 64 that allow the first and second electronic devices 62, 64 to upload their respective data streams to the media production service at a highest quality, with preference over the other devices 66 that are not registered to the event. On the other hand, the other devices 66 may not be configured for receiving recommendations or have not requested to receive recommendations from the network assistance service. In this situation, at high cell loads, the other devices 66 may have not been given permission to transmit in order to give priority to the first and second electronic devices 62, 64, so packets may be stuck in the other devices 66 for a period of time. Another possibility is that the network assistance service will provide recommendations to the other devices 66 not registered to the event that allow the other devices 66 to upload their respective data streams at a lower quality than the first and second electronic devices 62, 64 that are registered to the event. In another example, the priority information indicates that the first electronic device 62 has a higher priority than the second electronic device 64. In this situation, the network assistance service will provide recommendations to the first electronic device 62 that allow the first electronic device 62 to upload its data stream at a high quality. On the other hand, the network assistance service will provide recommendations to the second electronic device 64 that allow the second electronic device 64 to upload its data stream at a lower quality than the first electronic device 62.

In certain embodiments, the media production service can provide a priority ranking to individual electronic devices that are registered to the event. The network assistance service can have predetermined event-coordinated uplink network assistance data for each possible priority ranking. For example, media production service can assign a priority ranking of "1" to the first electronic device 62 and a priority ranking of "2" to the second electronic device 64. The network assistance service can then provide a first media rate recommendation to the first electronic device 62 based on its priority ranking of "1", and a second media rate recommendation, which is lower than the first media rate recommendation, to the second electronic device 64 based on its priority ranking of "2".

It should be appreciated that the priority information generated by the media production service, and the corresponding usage at the network assistance service is different from a SIM/subscription based quality of service functionality used in mobile networks based on, for example, quality of service class identifier classes. In certain embodiments, when a device is participating in an uplink media streaming event, the event-related media streaming data may receive a different priority compared to other non-event-related media streaming data that the device may be uploading or downloading. In other words, in certain circumstances the event-coordinated uplink network assistance data based on the priority information may only provide recommendations to the electronic device 62, 64 with regards to the event-related media streaming data only.

In certain embodiments, another function of the network assistance service is to provide feedback to the media production service regarding network conditions for the electronic devices that are registered to an event. Such feedback can prevent bad network connections from affecting the final media production by helping the media production service to decide which electronic device's data stream to use in the production and when to switch from an electronic device that can be on its way to losing optimum radio conditions.

After registering a plurality of data streams, the network assistance service can collect connection status information about radio conditions of one or more of the data streams during the event. The connection status information can include one or more link parameters including received signal strength, packet loss rate, an indication that the electronic device will soon be throttled based on a data limit, a radio condition variation parameter, a data load for the present cell, or an indication that the present cell is switching. The connection status information can also include application related parameters such as media or data rate indications per event and/or for individual connected electronic devices.

After collecting the connection status information, the network assistance service can determine network condition information and transmit the network condition information to the media production service. In certain embodiments, the network condition information includes raw connection status information. In certain embodiments, the network assistance service can perform statistical calculations or compare the connection status information to quality of service requirement parameters and provide a score or a rating of the quality of the network conditions. For example, the network condition information can include a packet loss rate, a weighted value on how well quality of service parameters are met, or a quality of experience prediction such as provided by mean opinion score prediction models (e.g. ITU-T P.1201 series models adapted to uplink streaming). In some embodiments, the network assistance service can use knowledge of upcoming network congestion that can be utilized to formulate a prediction of radio-related conditions. The media production service can utilize the predicted radio-related conditions to pre-emptively avoid upcoming disruptions or reductions in media quality. In another example, the network condition information can include an indication that data communications for a particular electronic device will soon be throttled. Upon receiving this information, the media production service can switch away from the soon-to-be throttled electronic device's data stream to avoid a disruption.

After determining the network condition information, the network assistance service can transmit the network condition information to the media production service. In certain embodiments, the network condition information is sent continuously in a real time manner, or sent continuously at a predetermined periodicity. Alternatively, or in combination with the periodic reporting, the transmission of the network condition information may be triggered based on a certain condition. In one example, the transmission of the network condition information may be triggered when the expected communication link capacity for a device, for the event, or for the network in total is reaching a threshold link capacity.

Figure 7:
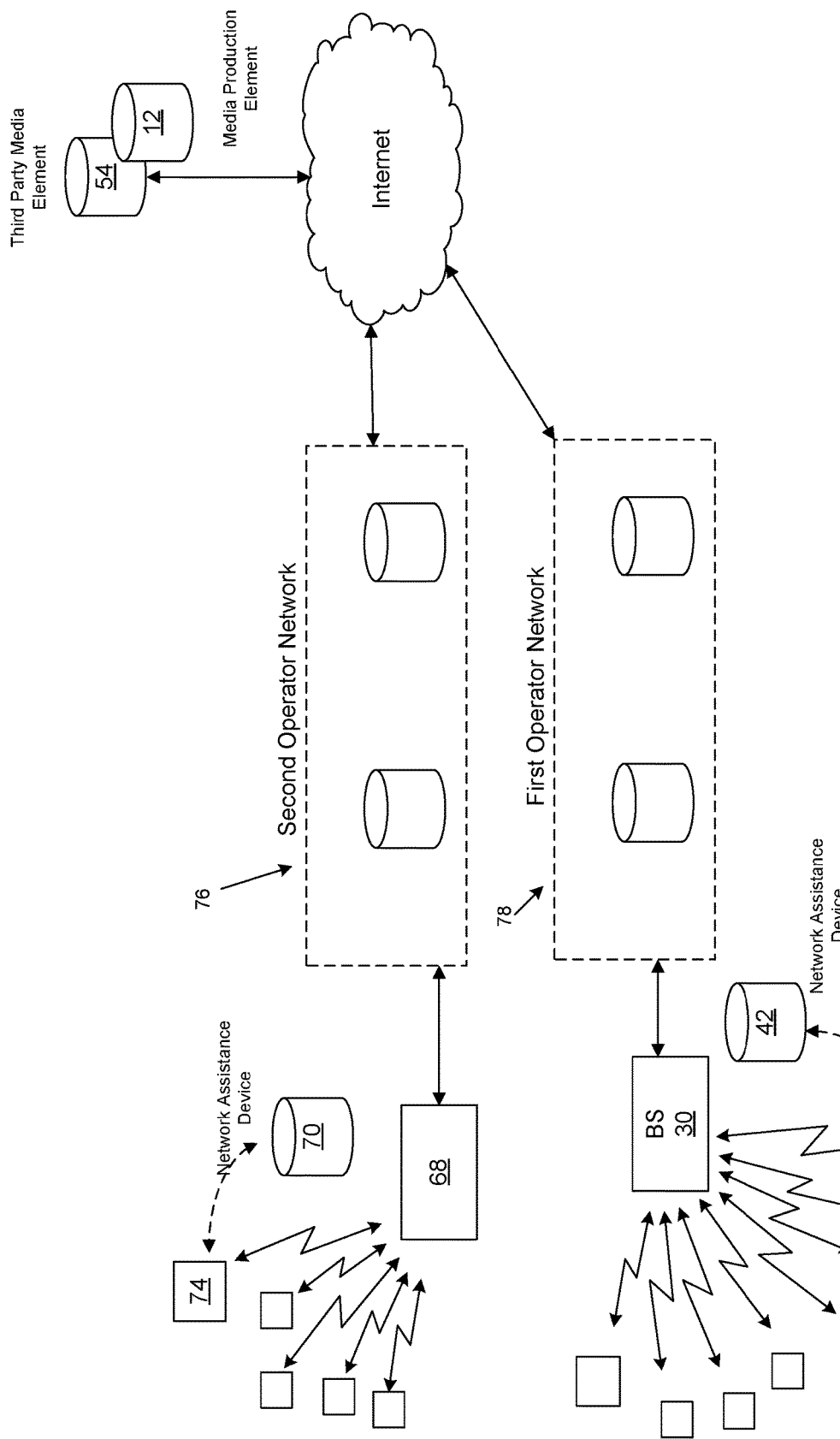
FIG. 7 is a schematic view of another representative embodiment of a network system that conducts network assistance for uplink media transmission for a collaborative media production utilizing two operator networks.

Turning now to FIG. 7, network condition information is beneficial also in a situation where different electronic devices 72, 74 participating in the event are connected to different operator networks 76, 78. When streaming data, the content could be aggregated over multiple operator networks, and with this method the priority for each event could, for example, be indicated to these multiple networks. In one example, a first electronic device 72 and a second electronic device 74 are both participating in an event and are both registered to the event with the respective network assistance service, which may be part of the devices' respective network assistance device 42, 70. In this example, the media production element 12 running the media production service is located on the internet and the network assistance devices 42, 70 are located within operator network domains. In such case the media production service can receive and determine individual network conditions for the different operator networks 76, 78 by receiving information from network specific network assistance devices 42, 70, and adapt the individual device upload streams to the media production from the different networks, which may be experiencing differing network-specific radio conditions.

FIGS. 8-12 describe various methods performed by network elements disclosed herein. It should be appreciated that any of the following methods can be performed individually, simultaneously, or in combination with each other.

Figure 8:
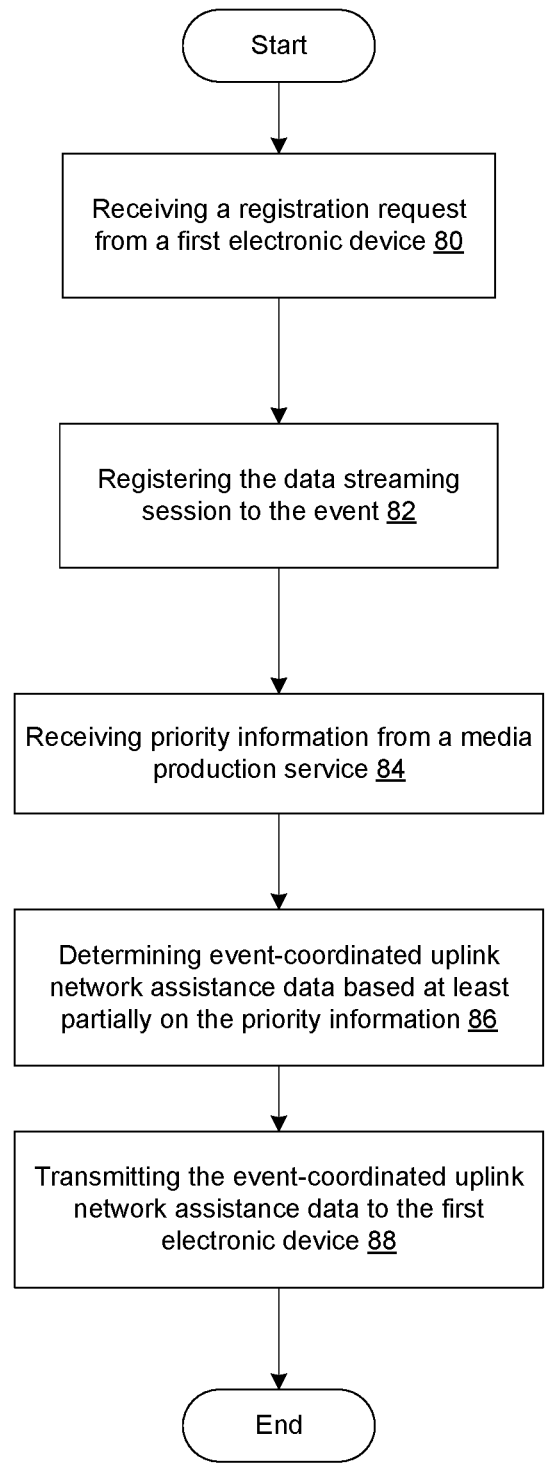
FIG. 8 is a flow diagram of a representative method of providing event-coordinated uplink network assistance by a network assistance service.

Turning now to FIG. 8, an embodiment of a method for providing event-coordinated uplink network assistance by a network assistance service to a plurality of electronic devices during streaming of data from the plurality of electronic devices in a network is disclosed. At reference numeral 80, the network assistance service receives a registration request from a first electronic device of the plurality of electronic devices for a data streaming session corresponding to an event. At reference numeral 82, the network assistance service registers the data streaming session to the event. At reference numeral 84, the network assistance service receives priority information from a media production service. The priority information includes at least one of an event priority corresponding to the event or an individual priority corresponding to the first electronic device. At reference numeral 86, the network assistance service determines event-coordinated uplink network assistance data based at least partially on the priority information. At reference numeral 88, the network assistance service transmits the event-coordinated uplink network assistance data to the first electronic device. It should be appreciated that the network assistance service can repeat steps of this method continuously or periodically as previously described.

Figure 9:
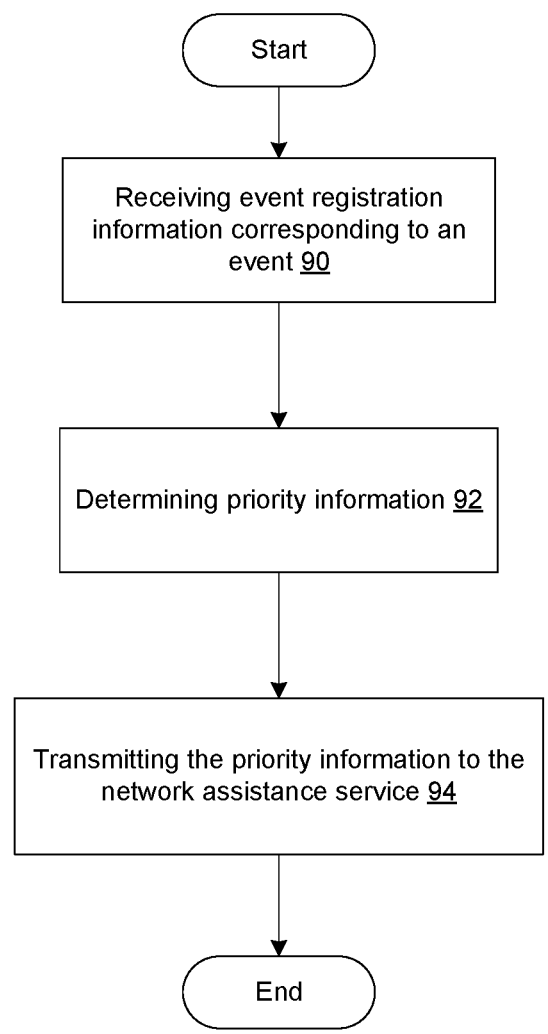
FIG. 9 is a flow-diagram of a representative method of providing priority information to a network assistance service from a media production service.

Turning now to FIG. 9, an embodiment of a method for providing priority information by a media production service to a network assistance service is disclosed. At reference numeral 90, the media production service receives event registration information corresponding to an event in which a plurality of electronic devices stream data. At reference numeral 92, the media production service determines priority information. The priority information includes at least one of an event priority corresponding to the event or an individual priority corresponding to a first electronic device registered to the event. At reference numeral 94, the media production service transmits the priority information to the network assistance service. It should be appreciated that the network assistance service can repeat certain steps of this method continuously or periodically as previously described.

Figure 10:
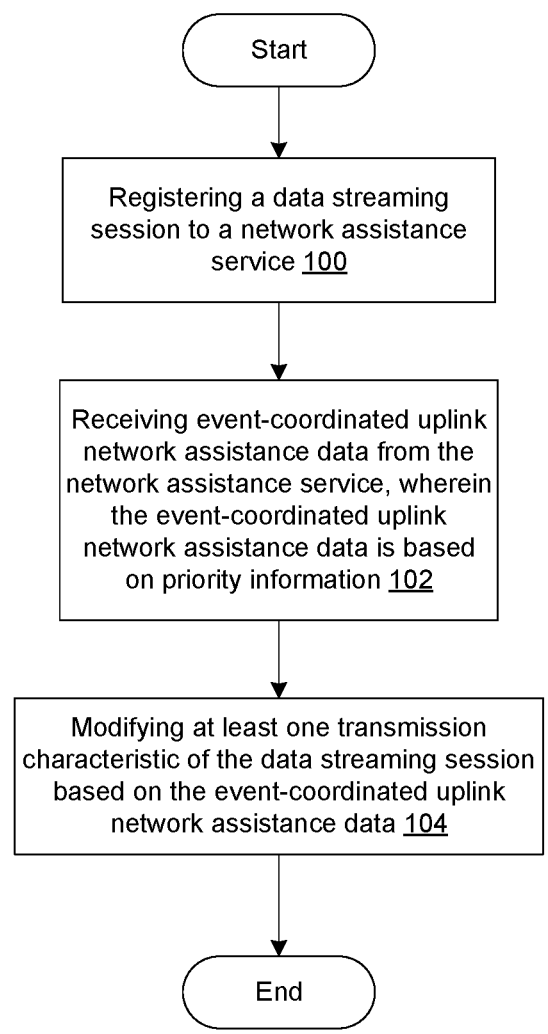
FIG. 10 is a flow diagram of a representative method of streaming data from an electronic device in a network, based on priority information.

Turning now to FIG. 10, an embodiment of a method for streaming data from an electronic device at an event is described. At reference numeral 100, the electronic device registers a data streaming session to a network assistance service or a media production service in response to determining that the data streaming session corresponds to an event. Registering the data streaming session includes transmitting device information. At numeral 102, the electronic device receives event-coordinated uplink network assistance data from the network assistance service. The event-coordinated uplink network assistance data is based on at least one of an event priority corresponding to the event, or an individual priority corresponding to the electronic device. At numeral 104, the electronic device modifies at least one transmission characteristic of the data streaming session based on the event-coordinated uplink network assistance data. It should be appreciated that the network assistance service can repeat steps of this method continuously or periodically as previously described.

Figure 11:
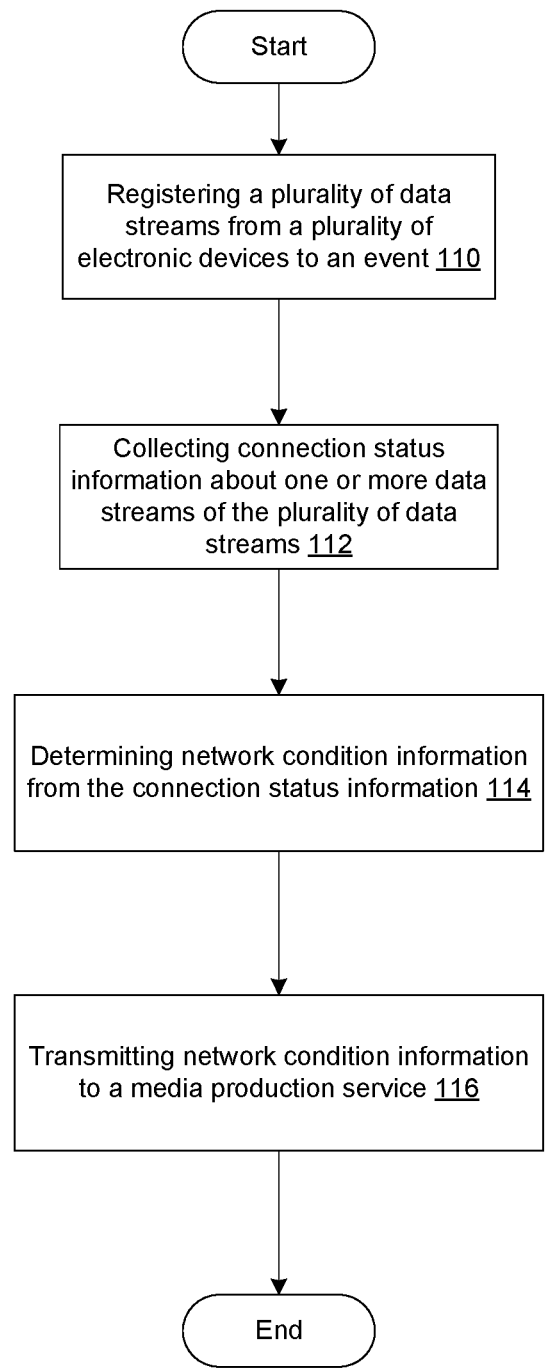
FIG. 11 is a flow diagram of a representative method of determining and providing network condition information from a network assistance service.

Turning now to FIG. 11, an embodiment of a method for providing event-coordinated uplink network assistance by a network assistance service to a plurality of electronic devices is disclosed. At reference numeral 110, the network assistance service registers a plurality of data streams from a plurality of electronic devices to an event. At reference numeral 112, the network assistance service collects connection status information about one or more data streams of the plurality of data streams during the event. At reference numeral 114, the network assistance service determines network condition information from the connection status information. At reference numeral 116, the network assistance service transmits network condition information to a media production service. It should be appreciated that the network assistance service can repeat steps of this method continuously or periodically as previously described.

Figure 12:
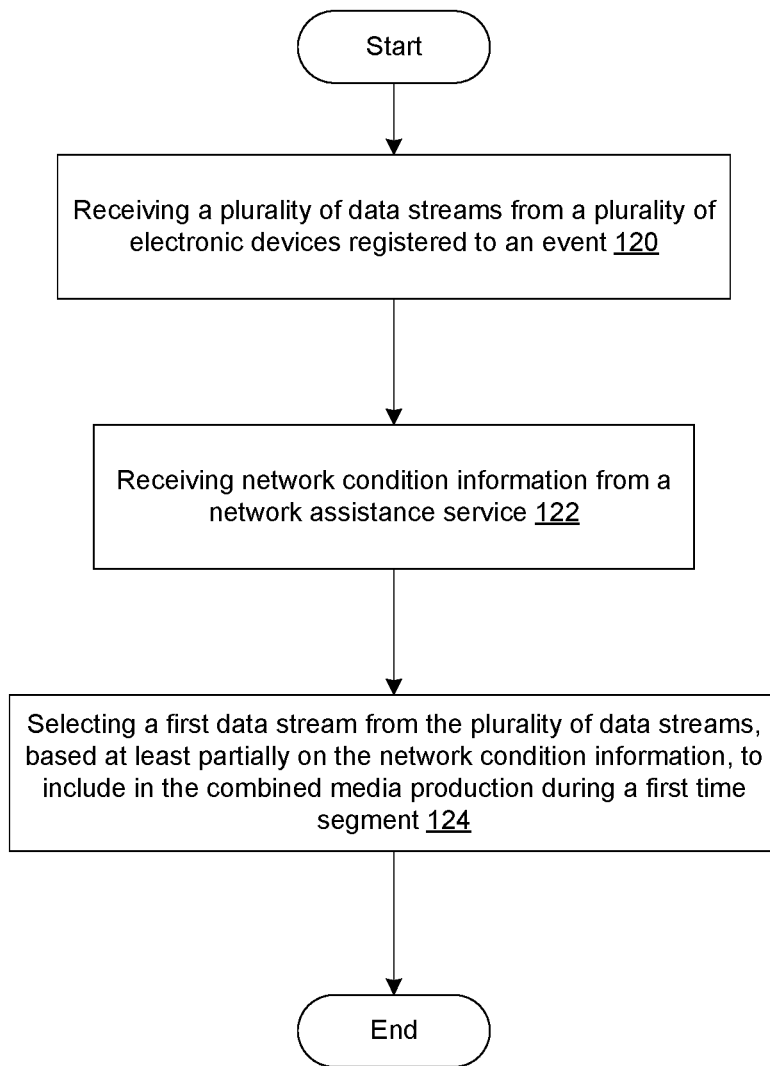
FIG. 12 is a flow-diagram of a representative method of utilizing network condition information by a media production service.

Turning now to FIG. 12, an embodiment of a method for producing a combined media production is disclosed. At reference numeral 120, the media production service receives a plurality of data streams from a plurality of electronic devices registered to an event. At reference numeral 122, the media production service receives network condition information for the plurality of data streams from a network assistance service. At reference numeral 124, the media production element selects a first data stream from the plurality of data streams, based at least partially on the network condition information, to include in the combined media production during a first time segment. It should be appreciated that the network assistance service can repeat certain steps of this method continuously or periodically as previously described.

D. Conclusion

Although certain embodiments have been shown and described, it is understood that equivalents and modifications falling within the scope of the appended claims will occur to others who are skilled in the art upon the reading and understanding of this specification.

What is claimed is:

1. A method of providing event-coordinated uplink network assistance by a network assistance service to a plurality of electronic devices, comprising:
   obtaining, by the network assistance service provided by a network assistance device, data regarding a plurality of uplink data sessions that have been registered to an event, each uplink data session being between a respective electronic device of the plurality of electronic devices and a media production service provided by a media production element, the event being a live situation from which the plurality of electronic devices simultaneously produce and transmit uplink media streams to the media production service in the respective uplink data sessions, allowing the media production service to create a combined media production using selections and combinations of content from the uplink media streams provided by the plurality of electronic devices;
   collecting, by the network assistance service, connection status information about radio conditions of one or more of the uplink media streams of the plurality of data streams during the event;
   determining future expected connection status information;
   determining, by the network assistance service, network condition information from the connection status information, wherein the network condition information is regarding network conditions for the plurality of electronic devices, and wherein determining the network condition information includes comparing the future expected connection status information to a network conditions requirement parameter; and
   transmitting, by the network assistance service, network condition information to the media production service to help the media production service decide which uplink media streams to use in the combined media production.

2. The method of claim 1, wherein the network assistance service is hosted by a DASH-aware network element (DANE).

3. The method of claim 1, wherein the network assistance service is hosted by a framework for live uplink streaming (FLUS).

4. The method of claim 1, wherein the connection status information comprises one or more link parameters including at least one of a received signal strength, a radio condition variation parameter, a data load for a present cell, or an indication of a switching between cells.

5. The method of claim 1, wherein the connection status information comprises one or more application parameters including at least one of an aggregated media rate for the event, an aggregated data rate for the event, a media rate for an individual electronic device of the plurality of electronic devices, or a data rate for the individual electronic device of the plurality of electronic devices.

6. The method of claim 1, wherein determining the network conditions information comprises comparing the connection status information to a network conditions requirement parameter.

7. The method of claim 1, wherein the network condition information is transmitted to the media production service at a predetermined periodicity.

8. The method of claim 1, wherein the network condition information is transmitted to the media production service based on a triggering event.

9. The method of claim 1, wherein the network condition information comprises a packet loss rate.

10. The method of claim 1, wherein the network condition information comprises raw radio condition parameters.

11. The method of claim 1, wherein determining the network condition information comprises calculating a weighted quality of service value from the connection status information.

12. The method of claim 1, wherein determining the network condition information comprises using a mean opinion score prediction model to determine a predicted quality of experience value.

13. The method of claim 1, wherein the network assistance service is implemented in or connected to a base station.

14. A network element that hosts a network assistance service, comprising a network interface and a control circuit configured to:
   obtain data regarding a plurality of uplink data sessions that have been registered to an event, each uplink data session being between a respective electronic device of the plurality of electronic devices and a media production service provided by a media production element, the event being a live situation from which the plurality of electronic devices simultaneously produce and transmit uplink media streams to the media production service in the respective uplink data sessions, allowing the media production service to create a combined media production using selections and combinations of content from the uplink media streams provided by the plurality of electronic devices;
   collect connection status information about radio conditions of one or more of the uplink media streams of the plurality of data streams during the event;
   determine future expected connection status information;
   determine network condition information from the connection status information, wherein the network condition information is regarding network conditions for the plurality of electronic devices, and wherein network condition information is determined by comparing the future expected connection status information to a network conditions requirement parameter; and
   transmit network condition information to the media production service to help the media production service decide which uplink media streams to use in the combined media production.

* * * * *